United States Patent [19]

Korenhof

[11] 4,040,683
[45] Aug. 9, 1977

[54] HUB BEARING UNIT

[75] Inventor: Abraham Korenhof, Driebergen, Netherlands

[73] Assignee: SKF Industrial Trading and Development Company B.V., Nieuwegein, Netherlands

[21] Appl. No.: 615,511

[22] Filed: Sept. 22, 1975

[30] Foreign Application Priority Data

Sept. 24, 1974 Netherlands .................... 7412565

[51] Int. Cl.² ............................................. F16C 1/24
[52] U.S. Cl. .................................. 308/187.1; 277/94; 308/191
[58] Field of Search ................ 308/36.1, 187, 187.1; 277/94, 95, 189

[56] References Cited

U.S. PATENT DOCUMENTS

| 3,841,723 | 10/1974 | Kelso | 308/187.1 |
| 3,854,734 | 12/1974 | West | 277/94 |
| 3,936,105 | 2/1976 | Asberg | 308/187.1 |

Primary Examiner—Joseph F. Peters, Jr.
Assistant Examiner—Richard A. Bertsch
Attorney, Agent, or Firm—Daniel M. Rosen

[57] ABSTRACT

A rolling bearing is provided with an integrally assembled fastening flange and inner and outer races and a plurality of rolling elements between the inner and outer races. The rolling elements are separated from one another by a bearing cage. A flexible material seals the area of the rolling elements and their contact surfaces for inhibiting penetration by foreign matter or loss of lubricant. At least one of the seals is fastened on one side of the rolling elements between the inner and outer races against respective first and second walls with each respective end of the seal contacting the first and second walls. The seal ends are held against the first and second walls by a relatively inflexible material element applied onto an exterior side of the seal out of contact with the walls and surrounding the exterior side of the seal for maintaining the seal ends in position.

11 Claims, 5 Drawing Figures

U.S. Patent  Aug. 9, 1977  4,040,683
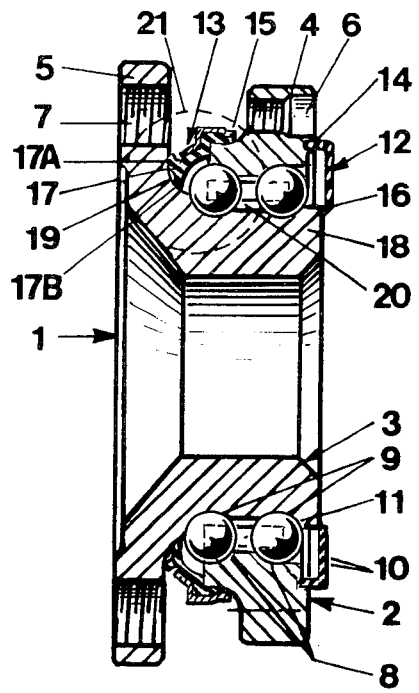
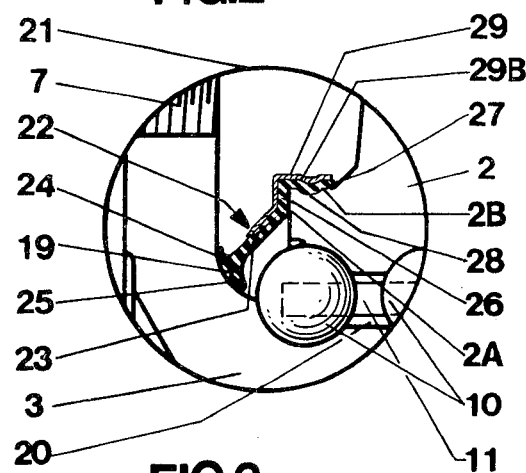
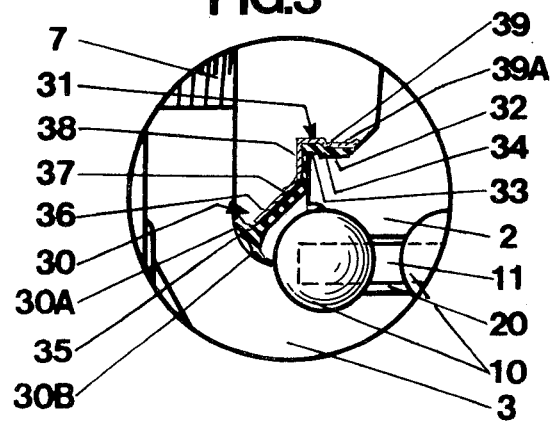
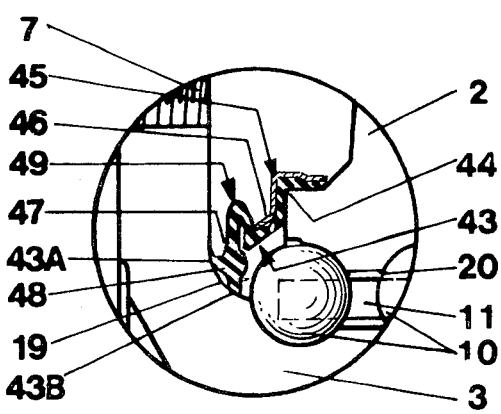
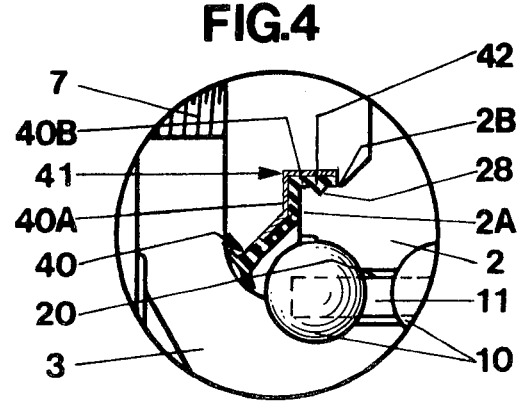

HUB BEARING UNIT

The present invention relates to rolling bearing, and particularly to a rolling bearing comprising a fastening flange and an inner and outer race (all of these forming an integral unit) between which rolling elements are located. In rolling bearings of this type, rolling elements are kept separated from one another by a cage, as well as seals which are made of a flexible material and prevent the penetration of dirt and the like into or between the rolling elements and their contact surfaces. The seals retain a lubricant which is contained between the rolling elements and the seals. Such bearings known as Hub Bearing Units are generally described in the French Pat. No. 2,181,369.

It is the object of the present invention to provide an improvement in such a bearing. The improvement relates particularly to fastening, adaptability to unfavourable operating conditions, and to the dimensional stability of the seal part of such bearings. In accordance with the present invention, the foregoing improvements also provide good mechanical protection of the seals, which are usually made of flexible and soft material. It is noted that a bearing of the type mentioned is often used as the wheel bearing of a vehicle and is thus exposed to unfavorable external operating conditions.

The foregoing object is achieved in accordance with the present invention in that a seal is fastened partly over a bearing race by clamping or deforming a fastening element placed around the seal. The described measure results in a uniform distribution of stresses in the fastening of the seal, which e.g. prevents out-of-roundness of the seal.

In addition, positioning or centering of the seal is achieved in a very exact and reliable manner when placing the seal on the bearing. In this way, the measure described completely prevents, at least during operation, the tendency of the seal to assume an oval shape, or shifting of the fastening part of the seal on the outer race, which increases the reliability and lifetime of the bearing.

According to a preferred embodiment, the antifriction bearing comprises a seal which is characterized by two relatively rigid, ring-shaped elements between which an elastic element is located. This assures that the sealing element, namely the sealing lips, always remain in the same track of the flange face of the outer race. This prevents excessive abrasive wear of the seal. Normally, if the bearing race-rings are not completely aligned with one another, the tendency to a kind of "pumping effect" between the sealing element and the flange face is enlarged. This effect is prevented or at least compensated in a favorable manner by this invention on the fact that the elastic element of the seal promotes accurate seating of the seal lips on the flange face under all operating conditions.

The invention will now be described by way of example only with reference to the drawings in which:

FIG. 1 shows a cross-section of a bearing in accordance with the invention.

FIGS. 2, 3, 4 and 5 each show, on an enlarged scale, a part of the bearing as encircled in FIG. 1, particularly the seal, which is located between the outer race-ring and a flange of the inner race-ring.

With reference to FIG. 1, the bearing 1 comprises an outer and inner race-ring 2 and 3 respectively, which together with flanges 4 and 5, form an integral unit. Flanges 4 and 5 are provided with openings 6 and 7 for use with threaded fasteners. Rows of rolling elements 10, which are separated from one another in the circular direction by means of a cage 11, are located on the contact surfaces 8 and 9 between the race-rings 2 and 3. The bearing 1 further comprises seals 12 and 13 of which one end, 14 and 15 respectively, is connected with the outer race 2 while the other end, 16 and 17 respectively, seals or supports against the end face 18 of the inner race 3 and the flange face 19, which forms the transition from the inner race 3 to the flange 5. In this embodiment, part 17 of the inner seal 13 comprises two seal lips 17A and 17B extending in opposite directions.

Since the bearing, which is intended for use as the wheel hub bearing of a vehicle, is exposed to unfavorable external operating conditions, severe requirements are obviously made on the seal. Thus, leakage of lubricant from the space 20, which is defined by the seals 12 and 13 and the bearing races 2 and 3, must definitely be avoided. On the other hand, penetration of dust, dirt or other soiling matter from the outside into space 20 must be prevented. These seals must also satisfy other requirements: the seal is not allowed to shift away from its fastening; the seal, which has the shape of a ring, must retain its round form after being placed on the outer race and is not allowed to assume another form, e.g. oval, as the result of stresses in the material.

The seal must have such a degree of flexibility that, in case the inner and outer race are not coaxial or aligned, the pumping effect which might possibly occur between the seal lips and flange face can be compensated for, i.e. the seal lips must always remain in the same "track". The embodiments in accordance with the present invention as are shown in FIG. 2 up to and including FIG. 5 meet these requirements in a favorable manner. Further, FIG. 2, which represents an enlargement of the encircled part 21 of the bearing shown in FIG. 1, shows sealing between race 2 and inner race 3 by the seal 22. The seal 22 comprises a ring-shaped element 23, which is made of a flexible material, e.g. rubber, and which terminates at one end in two seal lips 24 and 25, which are unsymmetrically shaped and press against the flange face 19, thus forming the transition from the inner race 3 to the flange 5. The other end section 26 partially contacts the end face 2A of the outer race 2, while the end section 27 lies on the edge section 2B of the race 2. In this embodiment, the section 2B has a groove 28 in which part of the end section 27 lies. Fastening of this seal is accomplished here by means of a metal ring 29, which covers a large part of section 23 and of sections 26 and 27 of the seal 22; fastening is further accomplished with the aid of a clamping device not shown in the drawing. In this embodiment, the metal ring 29 is clamped into position by uniformly shaping or pressing around section 27 of the seal 22; such a means of fastening is also called a crown cork fastening.

FIG. 3 shows fastening of a seal 30 on the race 2, wherein fastening is provided by clamping of a retaining ring 31 over a part 32 of seal 30. In this embodiment, the outer race 2 is provided with a raised edge 33, which changes, in the axial direction, into a flat section 34. In this embodiment, the seal 30 is provided with a bead 35 close to the seal lips 30A and 30B, the edge 36 of the retaining ring 31 lying against said bead. In addition, the retaining ring 31, which is made of an elastic material, is provided with an angled section 37, which changes over into a vertical section 38 and then ends in an almost horizontal section 39. In this favorable embodiment, section 39 has a recessed section 39A by means of which the clamping action is provided. Fastening of the retaining ring 31 to the seal 30 can also be accomplished mechanically, i.e. the ring 31 shown in the figure can, with the aid of an assembly tool which is not shown, be pushed in the axial direction from left to right passing the edge 33 of the outer race 2 over section 32 of the seal 30. Since the ring 31 is made of an elastic material and simultaneously possesses a recessed section 39A, the seal 30 is fastened on the edge 33 and on the ring-shaped surface 34 of the outer race by a certain clamping force. Further, a large part of the seal, which is made of relatively soft material, is externally protected and held in shape by ring 31 in this embodiment.

FIG. 4 shows an embodiment of a seal 40, wherein fastening to the outer race 2 is also accomplished by a retaining ring 41. Here, the race 2 is provided with a groove 28 in which a circumferential edge or bead 42 of the seal 40 fits. Fastening of the seal 40 to the outer race 2 can also be accomplished here completely mechanically by pushing the retaining ring 41, which is made of elastic material, shown in the figure in the axial direction from left to right over the end section 40B against the section 40A of the seal 40. The sections 40A and 40B are placed against or over the sections 2A and 2B of the outer race, while the section 40B with the bead or edge 42 in the groove 28 assures a long-lasting fastening to the outer race such that shifting of the seal 40 over the race 2 is practically impossible, at least during operation.

FIG. 5 shows an embodiment of the seal in accordance with the present invention, wherein, in addition to good fastening to the outer race, good adapting of the seal to abnormal operating conditions is simultaneously possible. To this end, the seal 43 is provided with a fastening section 44 which, in the same manner previously described, is fastened to the race 2 by clamping or deforming a retaining ring 45. The section between the central section 46 and the seal lips 43A and 43B of seal 43 has a special shape. This shape consists of a thickened section 47 in which, preferably, a ring 48 is located and by which the stiffness of this section can be determined. In addition, in going from the thickened section 47 to the center section 46, the seal 43 has a fold 49. This provides flexible fitting of the seal under all operating conditions of the bearing; thus the seal lips 43A and 43B can remain in their track when the inner and outer races are not aligned (misalignment). In addition, the elastic or especially flexible section 49 can easliy compensate for the difference in the positions of the races. Since the seal lips 43A and 43B can now remain in their track under all conditions, the seal can be simultaneously held under almost constant pressure by the seal lips although the heart-shaped curves of the inner and outer races form a small angle with one another. Furthermore, the flexible section 49 prevents a pumping effect, which can occur between the seal lips 43A and 43B and the flange face 19 in the above mentioned case and, as a result of which, lubricant can be drawn from the space 20, or dirt or the like can be forced into this space from the outside.

It should be noted that the seals 12 and 13 have the same material composition, i.e. both seals are made of a flexible and relatively wear-resistant material, and are covered on the outside by a metallic or appropriately suited protective ring. The present invention is not limited to the embodiments described here; according to the present invention, embodiments of a bearing in which the seal is fastened by means of a flat coil spring, a narrow leaf spring or a clamping strip with adjustable tension instead of the very wide fastening ring 15, 29, 31, 41 and 45 are also included.

What we claim is:

1. A rolling bearing comprising an integrally assembled fastening flange and inner and outer races, a plurality of rolling elements between said inner and outer races, said rolling elements separated from one another by a bearing cage, and flexible material seals for sealing the area of said rolling elements and their contact surfaces for inhibiting penetration by foreign matter or loss of lubricant, at least one of said seals being fastened on one side of said rolling elements between said inner and outer races against respective first and second walls, each respective end of said seal contacting said first and second walls respectively, and means for holding said seal ends against said first and second walls, said means for holding comprising a relatively inflexible material element applied onto an exterior side of said seal out of contact with said walls and surrounding said exterior side of said seal for maintaining said seal ends in position.

2. The bearing according to claim 1, wherein one end section of said seal is placed around said outer race, while the other end section is supported, with two or more seal lips, against the flange section of said inner race, said means for holding being a ring clamped at least partly over the seal positioned opposite and above said outer race.

3. The bearing according to claim 1, wherein at least one end section of said seal on a bearing race is fastened to said bearing race by means of the uniform pressing of a ring placed around said seal, said ring comprising said means for holding.

4. The bearing according to claim 1, wherein said means for holding is a fastening ring extending from the point of fastening on a race close to an end section of said seal.

5. The bearing according to claim 1, wherein a seal edge fits into a groove of said outer race.

6. The bearing according to claim 1, wherein said seal includes two relatively rigid ring-shaped parts between which a relatively elastic part is located.

7. The bearing according to claim 6, wherein said elastic part exists between a seal end section and a pair of seal lips forming the other end section of said seal.

8. The bearing according to claim 6, wherein said elastic part is formed mainly by a fold between the center section of said seal and a pair of seal lips forming the other end section of said seal.

9. The bearing according to claim 1, wherein said seal has a circumferential bead close to the end section of said seal formed into a pair of seal lips.

10. The bearing according to claim 9, wherein said means for holding is a ring located in said seal.

11. The bearing according to claim 1, wherein said seal is fastened by means of a spring with adjustable clamping tension placed over the fastening section.

* * * * *